US010874979B2

United States Patent
Ding et al.

(10) Patent No.: US 10,874,979 B2
(45) Date of Patent: Dec. 29, 2020

(54) METHOD AND SYSTEM FOR PURIFICATION OF NATURAL GAS USING MEMBRANES

(71) Applicant: AIR LIQUIDE ADVANCED TECHNOLOGIES, U.S. LLC, Houston, TX (US)

(72) Inventors: Yong Ding, Wayland, MA (US); Sandeep K. Karode, Boothwyn, PA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 661 days.

(21) Appl. No.: 15/367,582

(22) Filed: Dec. 2, 2016

(65) Prior Publication Data
US 2017/0157557 A1 Jun. 8, 2017

Related U.S. Application Data

(60) Provisional application No. 62/262,795, filed on Dec. 3, 2015.

(51) Int. Cl.
*B01D 53/22* (2006.01)
*B01D 53/26* (2006.01)
(Continued)

(52) U.S. Cl.
CPC .......... *B01D 53/225* (2013.01); *B01D 53/04* (2013.01); *B01D 53/22* (2013.01); *B01D 53/226* (2013.01);
(Continued)

(58) Field of Classification Search
CPC ...... B01D 53/04; B01D 53/047; B01D 53/22; B01D 53/225; B01D 53/226;
(Continued)

(56) References Cited

U.S. PATENT DOCUMENTS 4,770,676 A 9/1988 Sircar et al.
4,963,165 A * 10/1990 Blume ................ B01D 71/80
427/385.5

(Continued)

OTHER PUBLICATIONS

Hao, J.; Membrane Processes for Gas Separations, Part I: Removal of CO2 and H2S From Low-Quality Natural Gas, Part II: Enrichment of Krypton in Air; Dissertation; Graduate School of Syracuse University; Dec. 1998; 276 pp.

(Continued)

*Primary Examiner* — Jason M Greene
(74) *Attorney, Agent, or Firm* — Christopher J. Cronin

(57) ABSTRACT

Natural gas may be purified by removing $C_{3+}$ hydrocarbons and $CO_2$ in respective one or more separation units to yield conditioned gas lower in $C_{3+}$ hydrocarbons and $CO_2$ in comparison to the un-conditioned natural gas. Notably, the feed gas need not be subjected to joule-thomson expansion and molecular sieve dehydration performed by conventional processes. Rather, any water-rich reject stream from the separation unit(s) is dried downstream with a smaller compressor and smaller molecular sieve or gas separation membrane dehydration unit before it may be re-injected deep underground or deep under the sea bed.

17 Claims, 6 Drawing Sheets

(51) Int. Cl.
- B01D 71/76 (2006.01)
- B01D 53/04 (2006.01)
- B01D 71/52 (2006.01)
- B01D 71/56 (2006.01)
- C10L 3/10 (2006.01)
- E21B 43/40 (2006.01)

(52) U.S. Cl.
CPC ......... *B01D 53/228* (2013.01); *B01D 53/229* (2013.01); *B01D 53/26* (2013.01); *B01D 53/261* (2013.01); *B01D 53/265* (2013.01); *B01D 53/268* (2013.01); *B01D 71/52* (2013.01); *B01D 71/56* (2013.01); *B01D 71/76* (2013.01); *C10L 3/101* (2013.01); *C10L 3/104* (2013.01); *C10L 3/106* (2013.01); *E21B 43/40* (2013.01); *B01D 2256/24* (2013.01); *B01D 2256/245* (2013.01); *B01D 2257/504* (2013.01); *B01D 2257/7022* (2013.01); *B01D 2257/7025* (2013.01); *B01D 2257/7027* (2013.01); *B01D 2257/80* (2013.01); *B01D 2259/414* (2013.01); *C10L 2290/08* (2013.01); *C10L 2290/541* (2013.01); *C10L 2290/542* (2013.01); *C10L 2290/548* (2013.01); *Y02C 10/08* (2013.01); *Y02C 10/10* (2013.01)

(58) Field of Classification Search
CPC .. B01D 53/229; B01D 53/261; B01D 53/268; B01D 60/10; B01D 71/52; B01D 71/56; B01D 71/80; B01D 2257/504; B01D 2317/02; B01D 2317/04; C10L 3/101; C10L 3/104; C10L 3/106; C10L 2290/548
See application file for complete search history.

(56) References Cited

U.S. PATENT DOCUMENTS

| | | | |
|---|---|---|---|
| 5,053,965 A | | 10/1991 | Fujimura et al. |
| 5,256,296 A | * | 10/1993 | Baker ................ B01D 53/226 210/321.6 |
| 5,401,300 A | * | 3/1995 | Lokhandwala ........ B01D 53/22 95/49 |
| 5,669,958 A | | 9/1997 | Baker et al. |
| 5,776,990 A | | 7/1998 | Hedrick et al. |
| 6,053,965 A | * | 4/2000 | Lokhandwala ...... B01D 53/229 95/49 |
| 6,485,545 B1 | * | 11/2002 | Ohlrogge ............... B01D 53/22 95/39 |
| 6,648,944 B1 | * | 11/2003 | Baker .................. B01D 53/225 95/39 |
| 6,860,920 B2 | | 3/2005 | Simmons |
| 10,143,961 B2 | * | 12/2018 | Karode ............... B01D 53/268 |
| 2007/0006732 A1 | | 1/2007 | Mitariten |
| 2008/0034789 A1 | | 2/2008 | Fieler et al. |
| 2010/0186586 A1 | | 7/2010 | Chinn et al. |
| 2011/0247360 A1 | | 10/2011 | Hasse et al. |
| 2012/0157743 A1 | | 6/2012 | Liu et al. |
| 2012/0223014 A1 | * | 9/2012 | Boam .................... B01D 69/10 210/644 |
| 2013/0111949 A1 | * | 5/2013 | Gearhart .............. B01D 53/229 62/617 |
| 2014/0251897 A1 | | 9/2014 | Livingston et al. |
| 2014/0345880 A1 | | 11/2014 | Enis et al. |
| 2015/0053079 A1 | | 2/2015 | Koros et al. |
| 2017/0014753 A1 | * | 1/2017 | Peters .................. B01D 53/226 |

OTHER PUBLICATIONS

PCT Search Report and Written Opinion for PCT/US20161064598, dated Feb. 8, 2017.

Yampolskii, et al, "Membrane Gas Separation;" Wiley, 2010; p. 230, paragraphs 2-3; p. 231, paragraph 3; 231, figure 12,1(b).

Nunes, et al, "Dense hydrophilic composite membranes for ultra-filtration;" Journal of Membrane Science 106 (1995) 19-58; p. 50, section 2.

Rabiee, et al., "Gas transport properties of reverse-selective poly (ether-b-amide6)/[Emirn][13F4] gel membranes for 202/fight gases separation," Journal of Membrane Science 476 (2015) 286-302.

Stern, S. A, et al., Permeability of silicone polymers to ammonia and hydrogen sulfide, J. Appl. Polym. Sci., vol. 38, pp. 2131-2131 (1989).

* cited by examiner

US 10,874,979 B2

METHOD AND SYSTEM FOR PURIFICATION OF NATURAL GAS USING MEMBRANES

CROSS-REFERENCE TO RELATED APPLICATIONS

This application claims the benefit of priority under 35 U.S.C. § 119 (e) to U.S. Provisional Patent Application No. 62/262,795, filed Dec. 3, 2015, the entire contents of each of which are incorporated herein by reference.

BACKGROUND

Field of the Invention

The present invention relates to the purification of natural gas using gas separation membranes.

Related Art

Water, carbon dioxide, hydrogen sulfide and heavy hydrocarbons are common contaminants for natural gas. During the gas conditioning process, these contaminants are removed so that the natural gas can be used onsite or transported to the pipeline. Depending upon whether emissions of the reject gas from such a gas conditioning process are subject to governmental regulation, the reject stream from the gas conditioning process may be flared. The reject stream may instead be re-injected deep underground, thus producing near zero air emissions.

The conditioned gas has to meet certain natural gas pipeline specifications, such as a carbon dioxide concentration below 2% (vol/vol), a $C_{3+}$ hydrocarbon dewpoint of no more than −4° F. (−20° C.), and an $H_2S$ concentration of less than 2 ppm. The water concentration should be below 7 lb per million std $ft^3$ per day (11.2 kg per million std $m^3$ per day) and sometimes as much as below 5 lb per million std $ft^3$ per day (8.0 kg per million std $m^3$ per day). Additionally, the $C_{3+}$ hydrocarbon content of the conditioned gas should be limited so that the BTU/caloric content of the conditioned gas is about 950-1050 Btu (240-265 kcal).

In the event that the reject stream is re-injected deep underground, it has to be dry in to avoid corrosion of the injection line and the formation of hydrocarbon hydrates. The water content for the reinjected stream has to be below 50 ppm (vol/vol) and sometimes as low as 1 ppm (vol/vol).

In the natural gas conditioning process, gas separation membranes are normally utilized for carbon dioxide removal due to their relatively small foot print and light weight and their relatively high energy efficiency. Gas separation membranes can generate conditioned gas with a suitable moisture content. However, the reject gas is at a relatively lower pressure and it is of course enriched with water. The conventional solution is to first dehydrate the unconditioned feed gas with a molecular sieve and then treat the dehydrated gas with a gas separation membrane purification step. This type of hybrid process can indeed meet the specifications for both the conditioned gas and gas to be re-injected. However, the relatively high footprint, volume, and mass of the molecular sieve dehydration process are a concern for many natural gas conditioning applications, especially for off shore applications where the footprint, volume, and capacity to withstand massive equipment are at a premium.

As shown in FIGS. 1-2, the state of art process for removal of moisture, $C_{3+}$ hydrocarbons and $CO_2$ from off shore natural gas includes the following steps: molecular sieve dehydration, joule-thomson (JT) hydrocarbon dew point control, $H_2S$ removal, and $CO_2$ removal. In such a process, the entirety of the feed gas stream is first processed through a bulk and heavy molecular sieve dehydration unit before it is subjected to hydrocarbon dew point control and $H_2S$ and $CO_2$ removal. Because the molecular sieve treats the entirety of the feed gas stream, it must be sized accordingly. As a result, it may be too heavy, too bulky, and take up too large a footprint, especially for a floating production storage and offloading (FPSO) vessel. Thus, there is a need to provide a natural gas processing method and system that is relatively light and small and has a relatively small footpring.

It is well documented that glassy polymers, such as polyimide, polysulfone, polybenzimidazole, etc., exhibit exceptional high intrinsic $CO_2$/methane selectivity. However, the selectivity and permeance of the membranes prepared from those materials often quickly decrease once they are used for natural gas conditioning in the presence of $C_{3+}$ hydrocarbons. This loss of membrane performance is caused by condensation of the $C_{3+}$ hydrocarbons on the membrane surface. The conventional solution for this problem is to use a system including a molecular sieve and carbon trap for removing the $C_{3+}$ hydrocarbons upstream of $CO_2$ removal. Although these pretreatment systems can effectively remove heavy hydrocarbons from the natural gas stream, the cost of the pretreatment sometime can be prohibitive. Indeed, the cost of the pretreatment system can be as high as 50% of the total system cost (pretreatment plus membrane).

Thus, there is a need to provide a natural gas processing method and system that does not suffer an unsatisfactory deterioration in performance over time and is relatively inexpensive.

BRIEF SUMMARY

There is disclosed a method for purification of natural gas including methane, $CO_2$, water, and $C_{3+}$ hydrocarbons that includes the following steps. A feed gas consisting of the natural gas is fed to at least one separation unit. A dry conditioned natural gas is withdrawn from the at least one separation unit that is enriched in methane in comparison to the feed gas and deficient in $C_{3+}$ hydrocarbons, $CO_2$, and water in comparison to the feed gas. One or more gaseous reject streams are withdrawn from the at least one separation unit, wherein a totality of the one or more gaseous reject streams are enriched in deficient in $C_{3+}$ hydrocarbons, water, and $CO_2$ in comparison to the feed gas and deficient in methane in comparison to the feed gas. One of the gaseous reject streams are compressed so as to cause condensation of least some of the water contained therein produce a biphasic stream having liquid and gaseous phases. The gaseous phase is fed to a dehydration apparatus so as to remove at least some of the water contained therein and produce a stream of the dried gaseous phase.

There is also disclosed a system for purification of natural gas including methane, $CO_2$, water, and $C_{3+}$ hydrocarbons, comprising: a first gas separation unit comprising one or more gas separation membranes in parallel or in series each of which has a selective layer that is selective for $C_{3+}$ hydrocarbons over methane and water over methane, the first gas separation unit being adapted and configured to receive the natural gas and separate the natural gas into a water-enriched and $C_{3+}$ hydrocarbons-enriched stream and a water-deficient and $C_{3+}$ hydrocarbons-deficient stream; a second gas separation unit comprising one or more gas separation membranes in parallel or in series each of which has a selective layer that is selective for $CO_2$ over methane, the second gas separation unit in downstream flow communication with the first gas separation unit and being adapted and configured to receive the water-deficient and $C_{3+}$ hydrocarbons-deficient stream and separate the water-deficient and $C_{3+}$ hydrocarbons-deficient stream into a dry conditioned natural gas and a dry $CO_2$-enriched gaseous reject stream; a compressor in downstream flow communication with the first gas separation unit, the compressor being adapted and configured to receive and compress the water-enriched and $C_{3+}$ hydrocarbons-enriched stream from the first gas separation unit and produce a biphasic water-enriched and $C_{3+}$ hydrocarbons-enriched stream; a phase separator in downstream flow communication with the compressor, the phase separator being adapted and configured to receive the biphasic water-enriched and $C_{3+}$ hydrocarbons-enriched stream and separate the biphasic water-enriched and $C_{3+}$ hydrocarbons-enriched stream into gaseous and liquid phases; and a dehydration unit in downstream flow communication with the phase separator, the dehydration unit being adapted and configured to receive the gaseous phase from the phase separator and remove water from the gaseous phase to produce a dried $C_{3+}$ hydrocarbons-enriched stream.

The method and/or system may include one or more of the following aspects:

- the feed gas is extracted from a subsea or subterranean oil or gas field and has not been dehydrated after extraction therefrom.
- the stream of the dried gaseous phase is injected into a subsea or subterranean oil or gas field.
- the dry conditioned natural gas meets pipeline specifications for natural gas or fuel specifications for natural gas-powered heavy equipment.
- the dry conditioned natural gas has a carbon dioxide concentration below 3% (vol/vol) and a $C_{3+}$ hydrocarbon dewpoint of no more than −20° C.
- the dried gaseous phase has a water content of no more than 2 ppm.
- the separation unit comprises first and second separation units, at least some water and $C_{3+}$ hydrocarbons is removed from the feed gas at the first separation unit to provide a water-enriched and $C_{3+}$ hydrocarbons-enriched stream and a water-deficient and $C_{3+}$ hydrocarbons-deficient stream, the one or more gaseous reject streams includes first and second gaseous reject streams, the first gaseous reject stream is the water-enriched and $C_{3+}$ hydrocarbons-enriched stream, and at least some $CO_2$ is removed from the water-deficient and $C_{3+}$ hydrocarbons-deficient stream at the second separation unit to provide the dry conditioned natural gas and the second gaseous reject stream.
- each of the first and second separation units comprises an adsorbent bed, at least one of the adsorbent beds exhibits adsorptive affinity for $C_{3+}$ hydrocarbons over methane, at least one of the adsorbent beds exhibits adsorptive affinity for water over methane, and at least one of the adsorbent beds exhibits adsorptive affinity for $CO_2$ over methane.
- the first and second separation units include first and second gas separation membrane units, respectively, the first gas separation membrane unit includes one or more membranes in parallel or in series each of which has a selective layer that is selective for $C_{3+}$ hydrocarbons over methane and water over methane, and the second gas separation unit includes one or more membranes in parallel or in series each of which has a selective layer that is selective for $CO_2$ over methane.
- the selective layer of each of the gas separation membranes of the first gas separation membrane unit includes a polymer or copolymer including repeating units of a tetramethylene oxide, propylene oxide, or ethylene oxide monomer.
- the polymer or copolymer comprises repeating units according to formula (I):

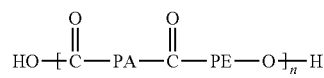

wherein:
PA is an aliphatic polyamide according to formula (II) or formula (III):

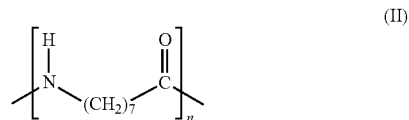

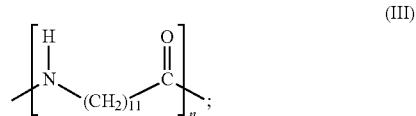

and
PE is poly(ethylene oxide) or poly(tetramethylene oxide).

- the polymer or copolymer includes copolymers obtained by copolymerization of acrylated monomers containing oligomeric propylene oxide, ethylene oxide, or tetramethyelene oxide.
- the polymer or copolymer includes a copolymer copolymerized from the monomers according to formulae (IV) and (V):

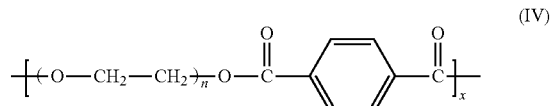

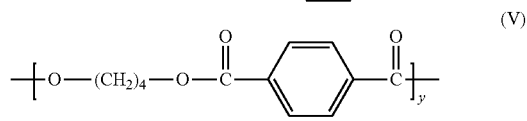

where $x+y=1$.

- each of the gas separation membranes of the first gas separation membrane unit has a membrane productivity for methane of below 68 GPU (22.4 mol/m²·sec·Pa). Often, it is below 34 GPU or even below 20 GPU.
- a pressure drop between the feed gas and the water-deficient and $C_{3+}$ hydrocarbons-deficient stream of the first gas separation membrane unit is less than 50 psi (3.45 bar), less than 30 psi (2.07 bar) or less than 20 psi (1.38 bar).
- the selective layer is supported by a support layer comprising poly(ether ether ketone).
- the dehydration apparatus comprises a molecular sieve.

the dehydration apparatus comprises a gas separation unit comprising one or more gas separation membranes that are selective for water over $CO_2$ and selective for water over $C_{3+}$ hydrocarbons.

the selective layer of each of the gas separation membranes of the second gas separation membrane unit comprises a polymer or copolymer selected from the group consisting of polyimides, cellulose acetate and polysulfone.

the membrane productivity for methane is below 68 GPU (22.4 mol/m²·sec·Pa) or below 34 GPU or below 20 GPU.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION

Figure 1:
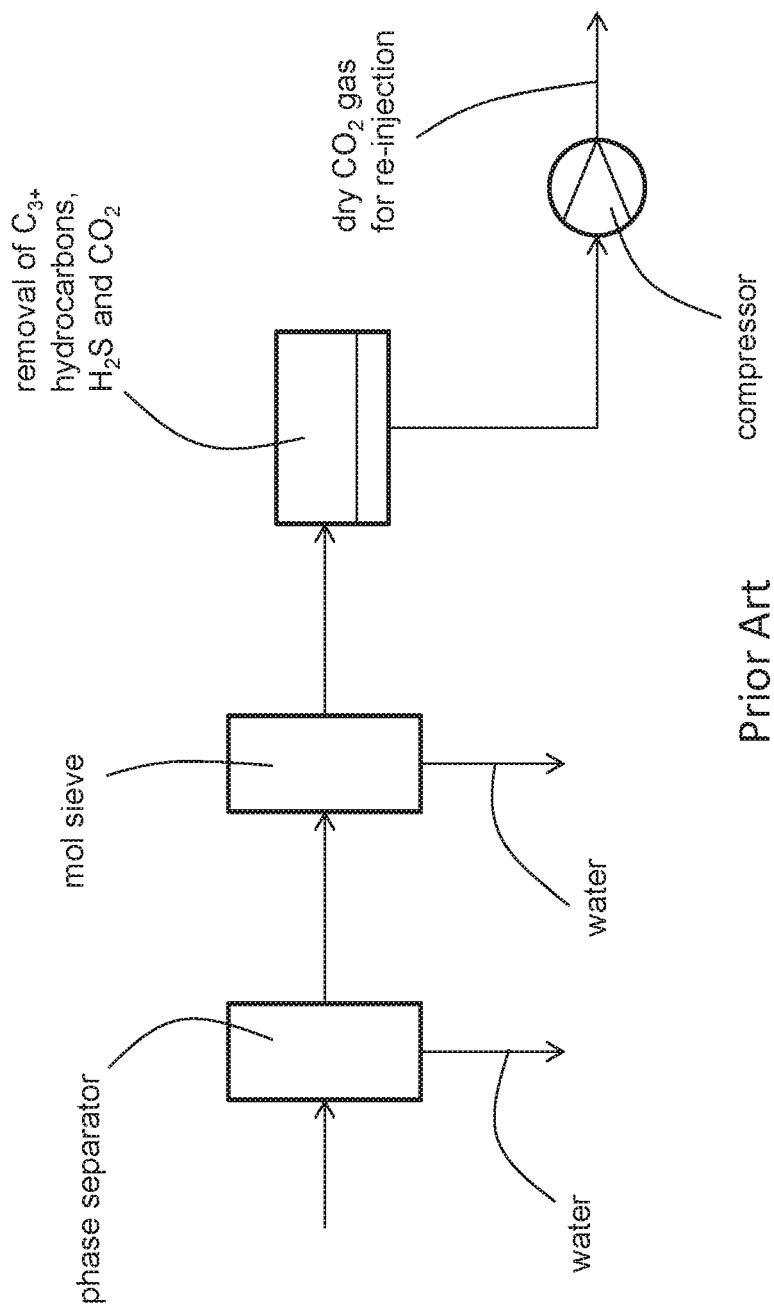
FIG. 1 is a schematic of a conventional process for conditioning natural gas that includes one gas separation membrane stage and upstream dehydration with joule-thomson expansion and molecular sieve dehydration.

Natural gas may be conditioned with gas separation membranes so as to meet desired levels of $C_{3+}$ hydrocarbons, $CO_2$, and optionally $H_2S$. The reject stream, enriched with $C_{3+}$ hydrocarbons, $CO_2$, and optionally $H_2S$, is dehydrated with either a molecular sieve or gas separation membrane downstream of the gas separation membranes in order to dry the reject stream prior to re-injection deep underground or deep under the sea bed.

The conditioning process includes feeding the feed gas (which has not already been dehydrated with a molecular sieve or equivalent dehydration technique to remove water) to a separation unit for removal of water, $C_{3+}$ hydrocarbons and $CO_2$. The separation unit may comprise one or more gas separation membranes or an adsorption bed or other moisture, $C_{3+}$ hydrocarbons, and $CO_2$ removal technique known in the field of natural gas conditioning.

The separation unit yields a dry conditioned gas that meets pipeline specifications for natural gas or fuel specifications for natural gas-powered heavy equipment such as compressors and generators. For example, the dry conditioned gas typically has a carbon dioxide concentration below 3% (vol/vol) or even equal to or less than 2% (vol/vol), a $C_{3+}$ hydrocarbon dewpoint of typically no more than −4° F. (−20° C.), and an $H_2S$ concentration of typically less than 4 ppm. Additionally, the $C_{3+}$ hydrocarbon content of the conditioned gas should be limited so that the BTU/caloric content of the conditioned gas is typically about 950-1050 Btu (240-265 kcal). The dry conditioned gas also typically has a water concentration below 7 lb per million std ft³ per day (11.2 kg per million std m³ per day) and sometimes as much as below 5 lb per million std ft³ per day (8.0 kg per million std m³ per day). In the case of export gas (i.e., gas that may be compressed, liquefied, and transported offsite in one or more storage tanks), the dry conditioned gas may have an even lower water concentration.

The separation unit also yields a water-rich reject gas stream that is compressed, fed to a phase separator where condensed water is removed, and subsequently fed to either a molecular sieve or gas separation membrane for removal of water. The thus-dried reject stream has a water concentration of no more than 2 ppm (vol/vol) or no more than 1 ppm (vol/vol). The dried reject gas stream is then re-injected deep underground or deep under the sea bed, depending upon where the natural gas was obtained.

When the separation unit is a gas separation membrane, it includes a selective layer that is selective for $C_{3+}$ hydrocarbons over methane and also $CO_2$ over methane. A permeate stream is withdrawn from a permeate side of the membrane and a retentate stream is withdrawn from the feed gas side of the membrane. By "selective for $C_{3+}$ hydrocarbons over methane", we mean that, as a whole, the $C_{3+}$ hydrocarbons become enriched in the permeate stream in comparison to the feed gas and the $C_{3+}$ hydrocarbons dewpoint of the retentate is lowered. Those skilled in the art of gas separation membrane technology will recognize that the $C_{3+}$ hydrocarbons dewpoint is the temperature at which cooling of the retentate will cause condensation of $C_{3+}$ hydrocarbons. The membranes of the separation unit may be arranged in series or in parallel.

When the separation unit is an adsorption bed, it includes an adsorbent that exhibits suitable affinity for $C_{3+}$ hydrocarbons and $CO_2$.

The conditioning process may alternatively split the functions of water, $C_{3+}$ hydrocarbons and $CO_2$ removal into first and second separation units. Each of the separation units may comprise one or more gas separation membranes or one or more adsorption beds or one or more other moisture, $C_{3+}$ hydrocarbons, and $CO_2$ removal techniques known in the field of natural gas conditioning. Typically, water and $C_{3+}$ hydrocarbons are removed by the first separation unit and $CO_2$ is removed in the second separation unit. It is within the invention to remove some $CO_2$ in the first separation unit, but it is understood that more $CO_2$ is removed in the second separation unit.

A first water-depleted and $C_{3+}$ hydrocarbons-depleted stream is withdrawn from the first separation unit and fed to a second separation unit which separates such a stream into a dry, conditioned gas stream (that meets pipeline specifications for natural gas or fuel specifications for natural gas-powered heavy equipment such as compressors and generators as described above) and a dry, $CO_2$-rich reject stream. The water-rich and $C_{3+}$ hydrocarbons-rich reject stream from the first separation unit is compressed, fed to a phase separator where condensed water is removed, and subsequently fed to either a molecular sieve or gas separation membrane for removal of water. The thus-dried reject stream has a water concentration of no more than 2 ppm (vol/vol) or as low as no more than 1 ppm (vol/vol). The dried reject gas stream is then re-injected, together with the dry, $CO_2$-rich reject stream from the second separation unit, deep underground or deep under the sea bed, depending upon where the natural gas was obtained.

When the first and second separation units are gas separation membranes, each of the membranes of the first separation unit includes a selective layer that is selective for moisture and $C_{3+}$ hydrocarbons over methane. A first permeate stream and a first retentate stream are withdrawn from the membrane(s) of the first separation unit. By "selective for $C_{3+}$ hydrocarbons over methane", we mean that, as a whole, the $C_{3+}$ hydrocarbons become enriched in the permeate stream in comparison to the feed gas and the $C_{3+}$ hydrocarbons dewpoint of the retentate is lowered. Those skilled in the art of gas separation membrane technology will recognize that the $C_{3+}$ hydrocarbons dewpoint is the temperature at which cooling of the retentate will cause condensation of $C_{3+}$ hydrocarbons. The membranes of the first separation unit may be arranged in series or in parallel. Similarly, the membranes of the second separation unit may be arranged in series or in parallel.

The first permeate stream is sent to the compressor where it is compressed, fed to a phase separator and dehydrated as explained above. The first retentate stream is fed to one or more membranes of the second separation unit. Each of the membranes of the second separation unit includes a selective layer that is selective for $CO_2$ over methane. A second permeate stream and a second retentate stream are withdrawn from the membrane(s) of the second separation unit. The second retentate stream constitutes the dry conditioned gas (that meets pipeline specifications for natural gas or fuel specifications for natural gas-powered heavy equipment such as compressors and generators) as described above. The second permeate stream, rich in $CO_2$, is already dehydrated and may be re-injected with the phase-separated and dehydrated first permeate stream.

When the first and second separation units are each an adsorption bed, the first separation unit includes a first adsorbent that exhibits suitable affinity for water and $C_{3+}$ hydrocarbons while the second separation unit includes a second adsorbent which exhibits suitable affinity for $CO_2$. Similar to the first and second gas separation membrane embodiment described above, the first and second adsorption bed embodiment will also yield the dry conditioned gas (that meets pipeline specifications for natural gas or fuel specifications for natural gas-powered heavy equipment such as compressors and generators) as described above, a water-enriched reject stream (to be subsequently compressed, phase-separated and dehydrated as described above), and a dehydrated $CO_2$-rich stream which may be re-injected with the phase-separated and dehydrated reject stream as described above.

Returning to membranes, we note that the separation layer of a membrane whose function is to remove water and $C_{3+}$ hydrocarbons may be made of a copolymer or block polymer of tetramethylene oxide, and/or propylene oxide, or ethylene oxide. These types of polymers exhibit only modest productivity (i.e., permeance) for methane and preferential permeation of $C_{3+}$ hydrocarbons. Due to the modest methane productivity of these polymers in comparison with silicone based polymers, membranes with low productivity for methane can be conveniently achieved. Through selection of a separation layer with only a modest methane productivity and preferential permeation of $C_{3+}$ hydrocarbons, a relatively low pressure drop across the first membrane stage (i.e., the difference in pressure between the feed gas and the retentate gas) may also be realized. As a result, there is no need for recompression of the first retentate before it is fed to the second stage. Typically, the pressure drop between the feed gas and the retentate gas is less than 50 psi (3.45 bar). The pressure drop may even be less than 30 psi (2.07 bar) or even less than 20 psi (1.38 bar). Typically, the membrane productivity for methane should be below 68 GPU (22.4 mol/m²·sec·Pa). Often, it is below 34 GPU or even below 20 GPU.

Copolymers or block polymers of tetramethylene oxide, and/or propylene oxide, or ethylene oxide may be conveniently synthesized, such as the polyester ether disclosed in U.S. Pat. No. 6,860,920.

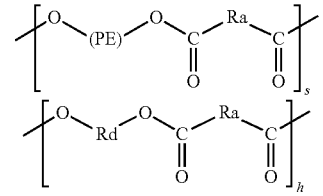

where PE may be one or more of the following structures:

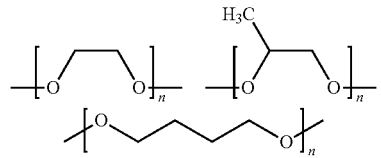

Other copolymers or block polymers of tetramethylene oxide, and/or propylene oxide, or ethylene oxide may be conveniently synthesized, such as polyimide ether disclosed in U.S. Pat. No. 5,776,990.

The copolymers can be further obtained by copolymerization of acrylated monomers containing oligomeric propylene oxide, ethylene oxide, or tetramethyelene oxide. Commercially available copolymers include poly(ether-b-amide) multiblock copolymers available from Arkema under the trade name of PEBAX, and poly(butylene terephthalate) ethylene oxide copolymer available under the trade name of Polyactive.

Typically, the PEBAX polymers from Arkema include PEBAX 7233, PEBAX 7033, PEBAX 6333, PEBAX 2533, PEBAX 3533, PEBAX 1205, PEBAX 3000, PEBAX 1657, or PEBAX 1074. PEBAX 1657 exhibits a methane permeability of 5.12 Barrer. H. Rabiee, et al., J. Membrane Sci. vol. 476, pp. 286-302 (2015). In contrast, PDMS exhibits a methane permeability of 800 Barrer. Stern, et al., J. Appl. Polym. Sci., Vol. 38, 2131(1989). The PEBAX polymers have repeating units according to formula (I):

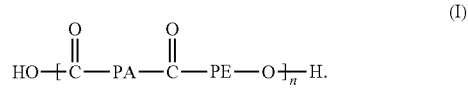
(I)

PE is poly(ethylene oxide) [PEO] or poly(tetramethylene oxide) [PTMEO]. PA is an aliphatic polyamide according to formula (II) or formula (III):

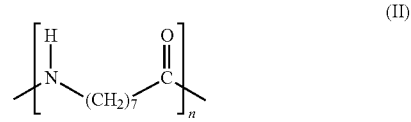
(II)

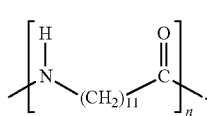

(III)

The aliphatic polyamide of formula (II) and (III) corresponding to nylon 6 and nylon 12, respectively. [PA12], and PE denotes a polyether "soft" block, either.

Commercial available PolyActive multiblock copolymers have the following general chemical structure:

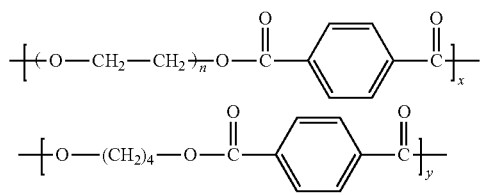

where x+y=1.

While each of the membranes of the first separation unit may have any configuration known in the field of gas separation, typically they are formed as a flat film or as a plurality of hollow fibers. In one embodiment, the separation layer is supported by a support layer where the separation layer performs the desired separation while the support layer provides mechanical strength. In the context of hollow fibers, the separation layer is configured as a sheath surrounding a core made of the support layer. Regardless of the configuration of the membrane, the support layer may be any porous substrate known in the field of gas separation membranes and includes but is not limited to, polyimides, polysulfones, and polyether ether ketones. Typical hollow fiber membrane supports are PEEK porous substrate fibers commercially available from Porogen, a division of Air Liquide.

Typically, the membranes of the first separation unit includes membranes commercially available from Air Liquide under the trade name PEEK-SEP.

The separation layer of each of the membranes whose function is to remove $CO_2$ may be made of any polymer known in the field of gas separation membranes that is selective for $CO_2$ over methane, including but not limited to polyimides, cellulose acetate and polysulfone. Typical polyimides are disclosed by US 20110247360, the polyimides of which are incorporated by reference. While these membranes may have any configuration known in the field of gas separation, typically they are formed as a spiral-wound film or as a plurality of hollow fibers. In one embodiment, the separation layer is supported by a support layer where the separation layer performs the desired separation while the support layer provides mechanical strength. In the context of hollow fibers, the separation layer is configured as a sheath surrounding a core made of the support layer. Regardless of the configuration of the membrane, the support layer may be any porous substrate known in the field of gas separation membranes. Suitable membranes for $CO_2$ removal are commercially available from Air Liquide Advanced Separations, a division of Air Liquide.

Figure 3A:
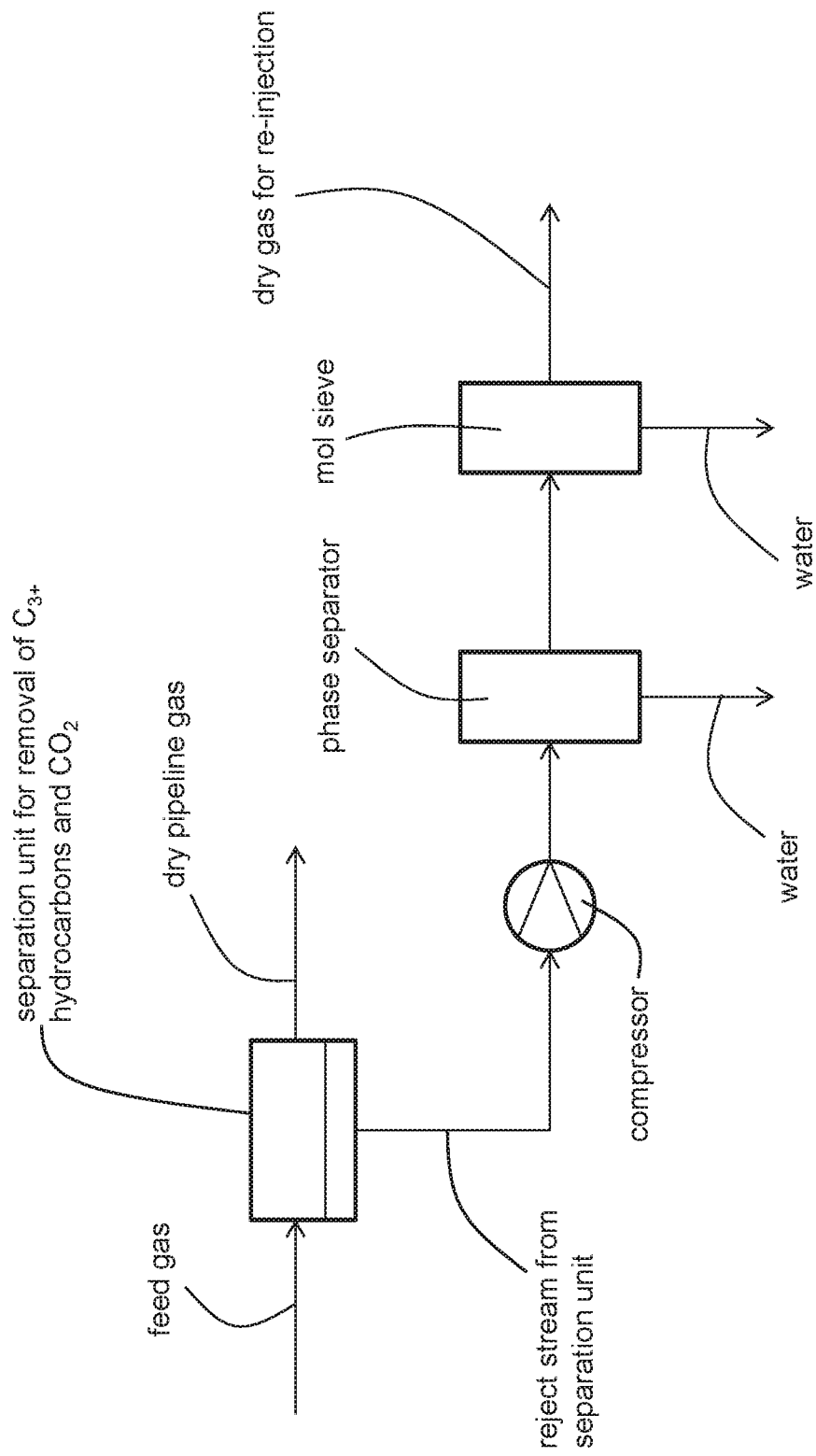
FIG. 3A is a schematic of an embodiment of the invention with one separation unit and molecular sieve dehydration.

As best illustrated in FIG. 3A, the unconditioned (i.e., not meeting pipeline or fuel gas specifications as described above) natural gas of the feed gas is fed to a separation unit. The separation unit separates the feed gas into a reject stream laden with water, $C_{3+}$ hydrocarbons and $CO_2$ and a dry conditioned natural gas stream which meets pipeline or fuel gas specifications as described above. The reject stream is fed to a compressor where it is compressed, resulting in condensation of some of the water contained in the reject stream. The condensed water is separated from the gaseous phase in a phase separator. A stream of the gaseous phase from the phase separator is subsequently fed to a molecular sieve. The molecular sieve removes enough water for the dehydrated reject stream to be re-injected deep underground or deep under the sea bed without an unsatisfactory degree of corrosion of the associated re-injection equipment. It has a water concentration of no more than 2 ppm (vol/vol) or as low as no more than 1 ppm (vol/vol).

Figure 3B:
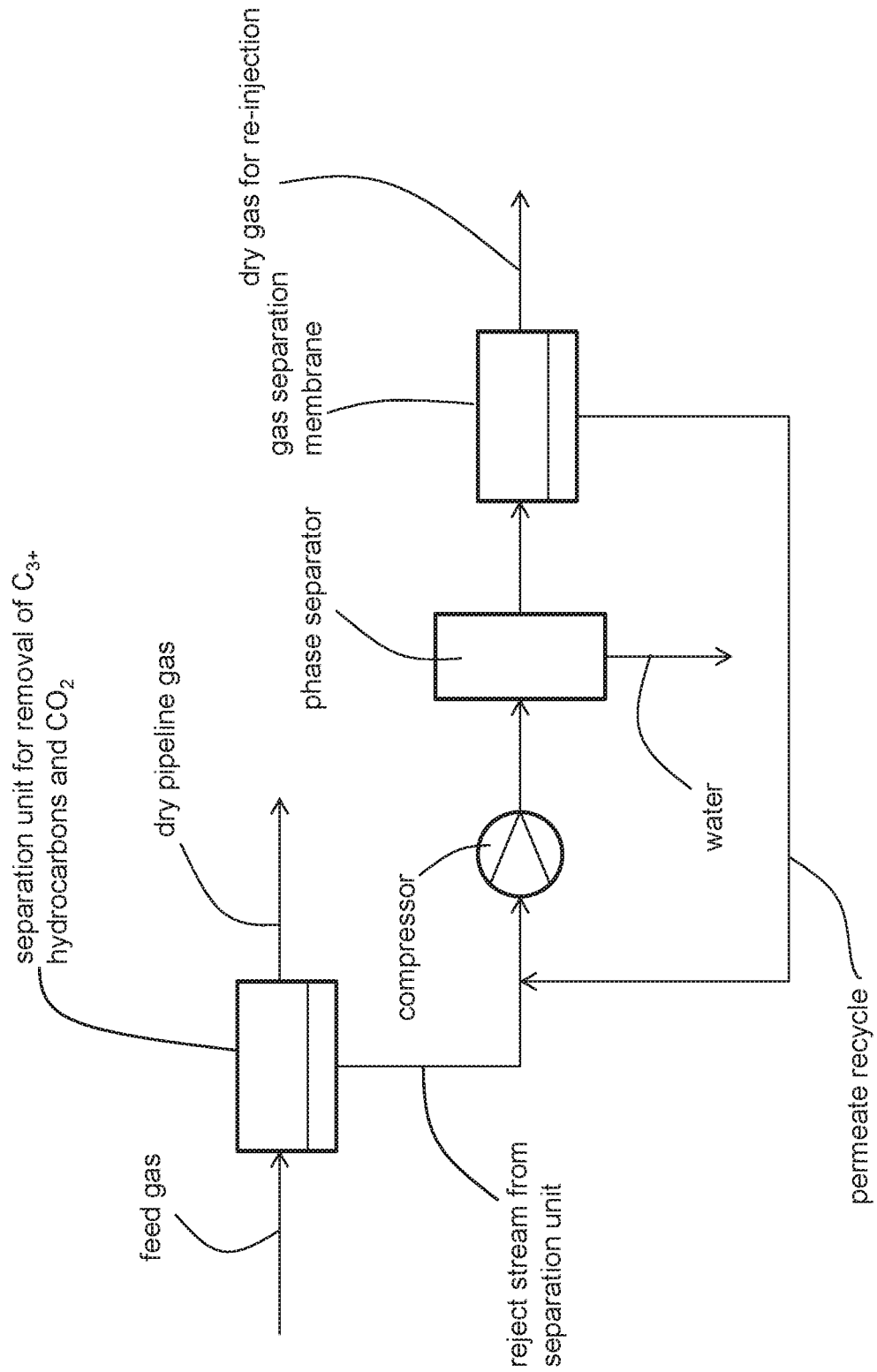
FIG. 3B is a schematic of another embodiment of the invention with one separation unit and gas separation membrane dehydration.

As best shown in FIG. 3B, the gas conditioning process is the same as that of FIG. 3A except for the molecular sieve dehydration step. The gaseous phase from the phase separator is fed as a stream to a gas separation membrane that is selective for water over $CO_2$. This downstream gas separation membrane separates the stream into a water-rich permeate recycle stream and a dehydrated reject stream that may be re-injected deep underground or deep under the sea bed without an unsatisfactory degree of corrosion of the associated re-injection equipment as described above. It has a water concentration of no more than 2 ppm (vol/vol) or as low as no more than 1 ppm (vol/vol). The water-rich permeate recycle stream is recycled to the compressor just upstream of the phase separator.

Figure 4A:
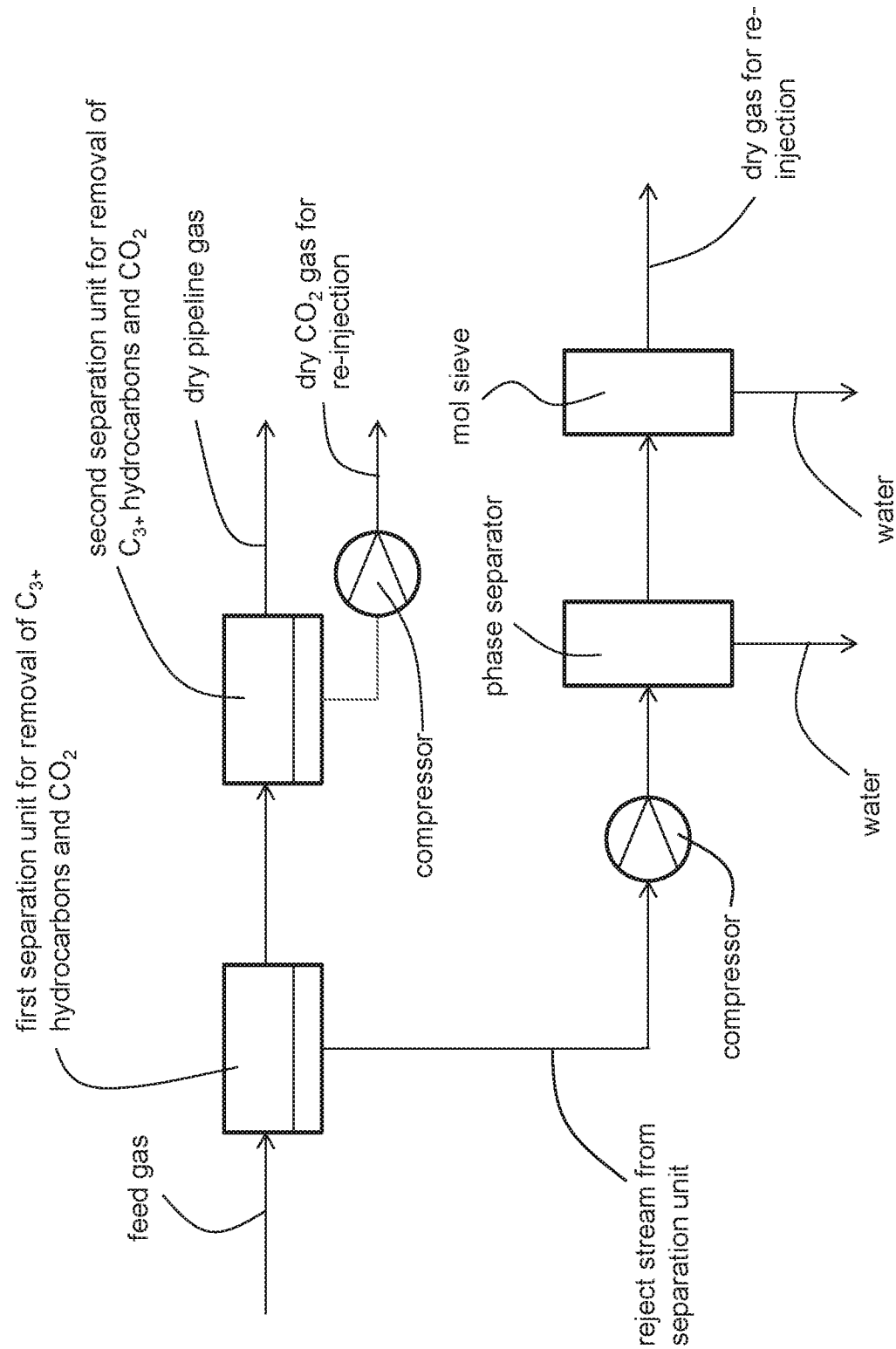
FIG. 4A is a schematic of an embodiment of the invention with two separation units and molecular sieve dehydration.

As best illustrated in FIG. 4A, the unconditioned (i.e., not meeting pipeline or fuel gas specifications as described above) natural gas of the feed gas is fed to a first separation unit. The first separation unit separates the feed gas into a first reject stream laden with water and $C_{3+}$ hydrocarbons and a 002 and a water-depleted and $C_{3+}$ hydrocarbons-depleted stream which is fed to the second separation unit. The second separation unit separates this stream into a second, dry, 002-rich reject stream and a dry, conditioned natural gas stream which meets pipeline or fuel gas specifications as described above. The first reject stream is fed to a compressor where it is compressed, resulting in condensation of some of the water contained in the reject stream. The condensed water is separated from the gaseous phase in a phase separator. A stream of the gaseous phase from the phase separator is subsequently fed to a molecular sieve. The molecular sieve removes enough water for the dehydrated first reject stream and the second, dry, 002-rich reject stream to be re-injected together deep underground or deep under the sea bed without an unsatisfactory degree of corrosion of the associated re-injection equipment as described above. The re-injected stream has a water concentration of no more than 2 ppm (vol/vol) or as low as no more than 1 ppm (vol/vol).

Figure 4B:
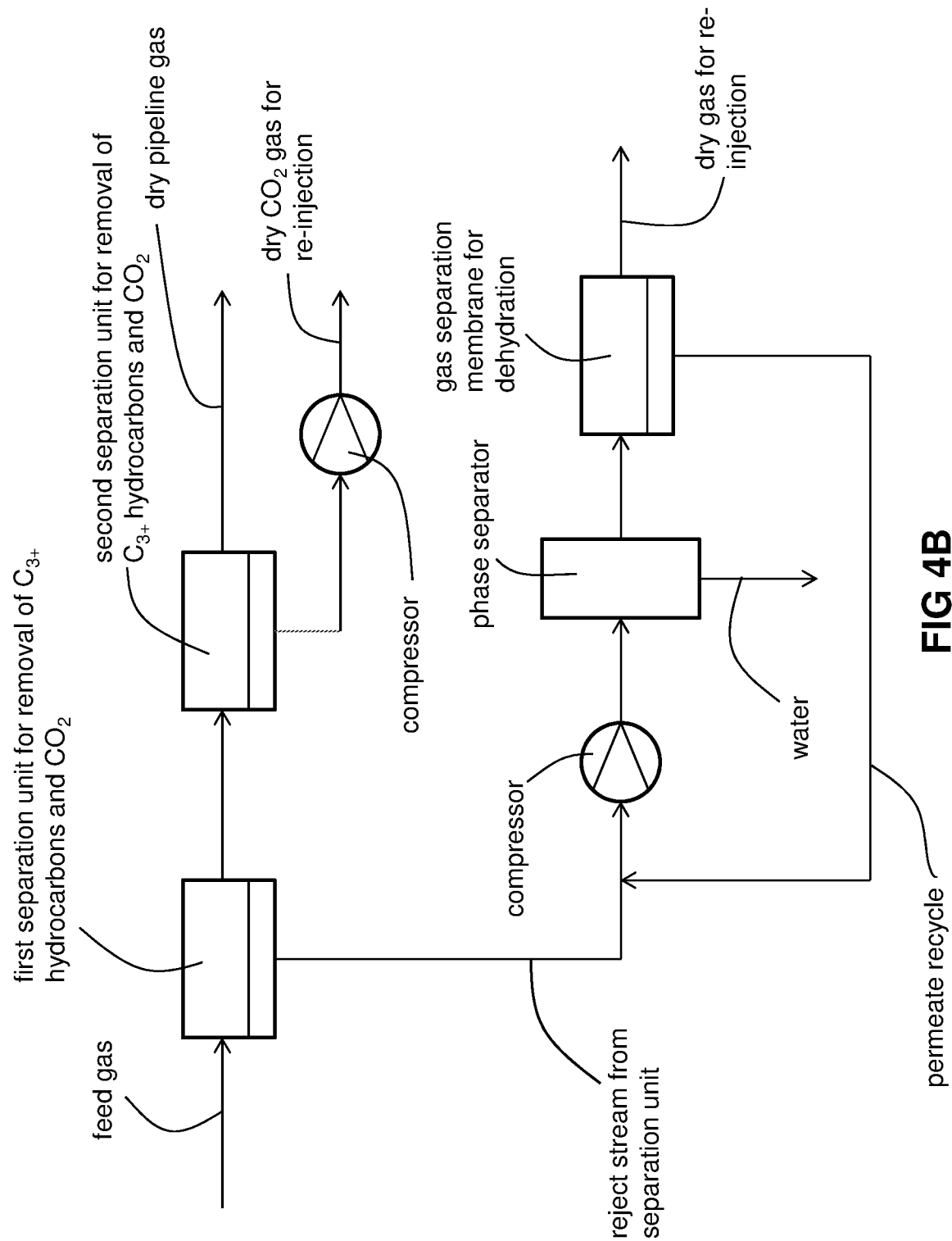
FIG. 4B is a schematic of another embodiment of the invention with two separation units and gas separation membrane dehydration.

As bet shown in FIG. 4B, the gas conditioning process is the same as that of FIG. 4A except for the molecular sieve dehydration step. The gaseous phase from the phase separator is fed as a stream to a gas separation membrane that is selective for water over $CO_2$. This downstream gas separation membrane separates the stream into a water-rich permeate recycle stream and a dehydrated reject stream that may be re-injected, together with the second, dry, $CO_2$-rich reject stream, deep underground or deep under the sea bed without an unsatisfactory degree of corrosion of the associated re-injection equipment as described above. The re-injected stream has a water concentration of no more than 2 ppm (vol/vol) or as low as no more than 1 ppm (vol/vol). The water-rich permeate recycle stream is recycled to the compressor just upstream of the phase separator.

Figure 2:
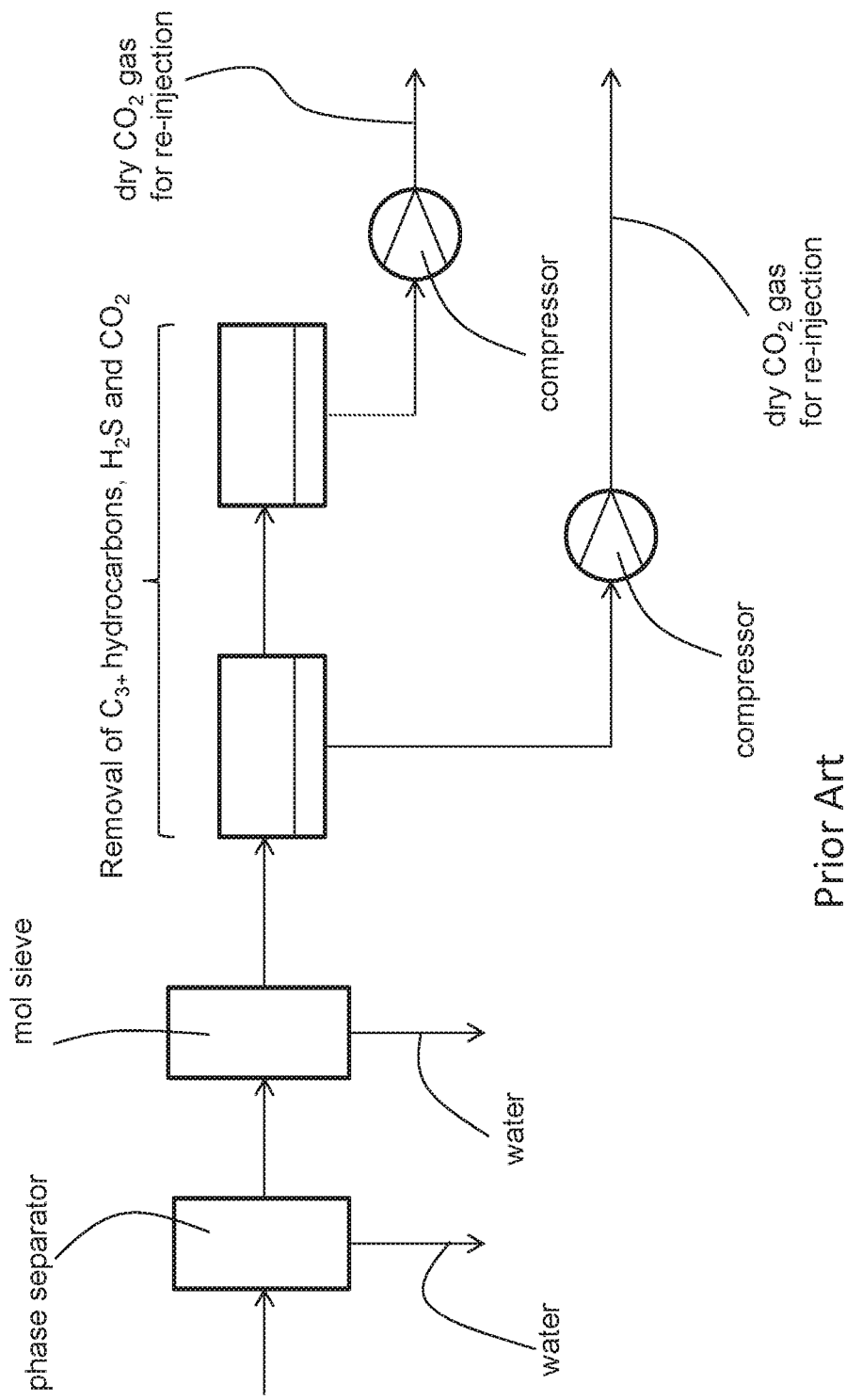
FIG. 2 is a schematic of a conventional process for conditioning natural gas that includes two gas separation membrane stages and upstream dehydration with joule-thomson expansion and molecular sieve dehydration.

The invention can reduce the weight, size, and foot print of the molecular sieve or gas separation membrane dehydration process by up to 90%. This invention moves the dehydration function of the molecular sieve of the prior art. Through judicious selection of a separation layer or adsorbent for the separation unit (or through judicious selection of first and second separation layers or first and second adsorbents for the respective first and second separation units), the flow rate of gas to be treated by the molecular sieve or gas separation membrane process is a relatively small fraction of the flow rate of the gas stream that is treated by a molecular sieve in conventional processes. Depending on the separation efficacy of the membrane or adsorbent bed, the flow rate to be dehydrated downstream of the separation unit (or first and second separation units) can be as low as 10% of the flow rate treated by the molecular sieve of conventional processes. Thus the space, weight, and footprint for the molecular sieve or gas separation membrane dehydration unit may be decreased by as much as 90%. Additionally, the compression energy consumed by the conventional methods of FIGS. 1 and 2 for the feed gas need not so high so as to accommodate a joule-thomson expansion step, a molecular sieve, and also a membrane step for removal of water. Because the compression energy for the feed gas in the invention does not need to accommodate a joule-thomson expansion step and a molecular sieve, the overall compression energy required by the invention (when taking into account the compression energy necessary for providing a driving force for dehydration of the reject stream downstream of the separation unit(s)) may reach as low as 10% of that of conventional processes.

PROPHETIC EXAMPLES

Example 1

A computer simulation was performed in order to demonstrate the relatively low pressure drop across the membranes of the first separation unit. In the simulation, a feed gas with the following gas composition was fed into a composite membrane including a PEBAX separation layer and a PEEK support layer with methane permeance of 15 GPU at 1000 psia and 30 C. The membrane cartridge exhibits a pressure drop of only 37 psi. The results are tabulated in Table I.

TABLE I results of computer simulation of Example 1

|  | FEED | RETENTATE | PERM |
|---|---|---|---|
| flow (MMSCFD (60° F.)) | 1.257 | 1 | 0.2567 |
| pressure (psia) | 1000 | 963.88 | 26.3 |
| water concentration (mol %) | 0.1991 | 0.0043 | 0.9582 |
| $CO_2$ concentration (mol %) | 44.9649 | 37.0415 | 75.8347 |
| $N_2$ concentration (mol %) | 0.4978 | 0.6132 | 0.0486 |
| ethane concentration (mol %) | 5.5858 | 5.9936 | 3.9967 |
| propane concentration (mol %) | 3.6243 | 3.7977 | 2.9486 |
| n-butane concentration (mol %) | 1.613 | 1.4971 | 2.0646 |
| n-pentane concentration (mol %) | 0.4978 | 0.3258 | 1.1681 |
| n-hexane concentration (mol %) | 0.2091 | 0.1007 | 0.6313 |
| methane concentration (mol %) | 42.8082 | 50.6262 | 12.3492 |

Comparative Example 1

A computer simulation was also attempted for the purpose of demonstrating a process that is not of the invention. A silicone based membrane with methane permeance of 120 GPU is used. The same feed condition as in the Example was used for the calculation. The pressure drop is so significant that the calculation did not converge.

Example 2

This example is carried out according to the present invention. The feed gas has the same gas composition, pressure, temperature as the one in the Example 1. The gas is first fed into a PEEK-Sep™ hollow fiber membrane to remove water down to 1 ppm. At the same time, some $CO_2$ is removed as well. Gas compositions and flow rates for the retentate and the permeate are shown below. The dehydrated retentate gas is then fed into a different membrane unit to produce a fuel gas with $CO_2$ concentration at 2% and a permeate gas with water concentration below 2 ppm for reinjection. The results are tabulated in Table 2.

TABLE 2 computer simulation results for Example 2

| Component | Feed mol % | Retentate mol % | Permeate mol % |
|---|---|---|---|
| Flow Rate (MMSCFD) | 100 | 68.8 | 31.2 |
| water | 0.20 | 0.0001 | 0.67 |
| $CO_2$ | 44.99 | 36.39 | 65.05 |
| methane | 43.57 | 52.21 | 25.04 |
| ethane | 5.01 | 5.55 | 3.74 |
| propane | 3.02 | 3.13 | 2.76 |
| i-butane | 0.48 | 0.47 | 0.82 |
| n-butane | 1.15 | 1.12 | 1.21 |
| i-pentane | 0.27 | 0.24 | 0.33 |
| n-pentane | 0.74 | 0.67 | 0.90 |
| hexanes | 0.21 | 0.19 | 0.26 |

The permeate gas from the PEEK-Sep™ hollow fiber membrane is compressed to 1050 psia to drop out some water (the recompression is required for reinjection). The water saturated gas (water concentration of 0.2%) is then fed into a molecular sieve dehydration unit to remove water down to 1 ppm. The total gas flow treated by the molecular sieve unit is 31.2 MMSCFD and the total water removed is 2970 lb/day. Therefore, the volume and weight of the molecular sieve dehydration unit of the present invention are about 30% of those of the molecular sieve dehydration unit for the conventional process.

Comparative Example 2

This example is carried out not according to the present invention. A feed gas containing 45% of $CO_2$ with the gas composition of Table 3 is treated using conventional molecular sieve dehydration technology. The feed flow is 100 MMSCFD, the feed pressure is 1050 psia, and the feed temperature is 40° C. The gas is saturated with water at the concentration of 2000 ppm. The gas is fed into a molecular sieve dehydration unit to remove water down to 1 ppm. The dehydrated gas is then fed into a membrane unit to produce a fuel gas with $CO_2$ concentration at 2% and a permeate gas with water concentration below 2 ppm for reinjection. The total gas flow treated by the molecular sieve unit is 100 MMSCFD and the total water removed is 9530 lb/day.

TABLE 3 composition of gas treated using conventional technology

| Component | mol % |
|---|---|
| water | 0.20 |
| CO$_2$ | 44.99 |
| methane | 43.57 |
| ethane | 5.01 |
| propane | 3.02 |
| i-butane | 0.48 |
| n-butane | 1.15 |
| i-pentane | 0.27 |
| n-pentane | 0.74 |
| hexanes | 0.21 |

Example 3

This example is carried out according to the present invention. The feed gas has the same gas composition, pressure, temperature as the one in the Example 3. The gas is first fed into a PEEK-Sep™ hollow fiber membrane to remove CO$_2$ down to 2%. The gas compositions and flow rates for the retentate and the permeate are shown below in Table 4. The dehydrated retentate gas is for sale or used as fuel.

TABLE 4 gas compositions and flow rates for Example 3

| Component | Feed mol % | Retentate mol % | Permeate mol % |
|---|---|---|---|
| Flow Rate (MMSCFD) | 100 | 70.6 | 29.4 |
| water | 0.13 | 0.0004 | 0.4460 |
| CO$_2$ | 9.90 | 2.00 | 29.16 |
| Methane | 83.84 | 91.53 | 68.75 |
| Ethane | 2.95 | 3.67 | 1.34 |
| Propane | 0.87 | 1.13 | 0.27 |
| i-Butane | 0.22 | 0.31 | 0.02 |
| n-Butane | 0.17 | 0.24 | 0.02 |
| i-Pentane | 0.08 | 0.11 | 0.00 |
| n-Pentane | 0.05 | 0.07 | 0.00 |
| Hexanes | 0.63 | 0.89 | 0.01 |

The permeate gas from the PEEK-Sep™ hollow fiber membrane is compressed to 1200 psia to drop out some water (the recompression is required for reinjection). The water saturated gas (water concentration of 0.13%) is then fed into a molecular sieve dehydration unit to remove water down to 1 ppm. The total gas flow treated by the molecular sieve unit is 29.4 MMSCFD and the total water removed is 1820 lb/day. Therefore, the volume and weight of the molecular sieve dehydration unit of the present invention are about 30% of those of the molecular sieve dehydration unit for the conventional process.

Comparative Example 3

This example is carried out not according to the present invention. A feed gas containing 10% of CO$_2$ with the gas composition of Table 5 is treated using conventional molecular sieve dehydration technology. The feed flow is 100 MMSCFD, the feed pressure is 1200 psia, and the feed temperature is 40° C. The gas is saturated with water at the concentration of 1300 ppm. The gas is fed into a molecular sieve dehydration unit to remove water down to 1 ppm. The dehydrated gas is then fed into a membrane unit to produce a fuel gas with CO$_2$ concentration at 2% and a permeate gas with water concentration below 2 ppm for reinjection. The total gas flow treated by the molecular sieve unit is 100 MMSCFD and the total water removed is 6193 lb/day.

TABLE 5 composition of gas treated according to Comparative Example 3

| Component | mol % |
|---|---|
| water | 0.13 |
| CO$_2$ | 9.90 |
| methane | 83.84 |
| ethane | 2.95 |
| propane | 0.87 |
| i-butane | 0.22 |
| n-butane | 0.17 |
| i-pentane | 0.08 |
| n-pentane | 0.05 |
| hexanes | 0.63 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for purification of natural gas including methane, CO$_2$, water, and C$_{3+}$ hydrocarbons, comprising the steps of:

feeding a feed gas consisting of the natural gas to a first separation unit;

withdrawing a a first retentate stream from the first separation unit that is enriched in methane in comparison to the feed gas and deficient in $C_{3+}$ hydrocarbons, $CO_2$, and water in comparison to the feed gas;

withdrawing a first permeate stream from the first separation unit that is enriched in $C_{3+}$ hydrocarbons, water, and $CO_2$ in comparison to the feed gas and deficient in methane in comparison to the feed gas;

feeding the first retentate stream to a second separation unit;

withdrawing a dry conditioned natural gas from the second separation unit that is enriched in methane in comparison to the first retentate stream and deficient in $C_{3+}$ hydrocarbons, $CO_2$ and water in comparison to the first retentate stream;

withdrawing a second permeate stream from the second separation unit that is enriched in $C_{3+}$ hydrocarbons, water, and $CO_2$ in comparison to the first retentate stream and deficient in methane in comparison to the first retentate stream;

compressing the first permeate stream so as to cause condensation of least some of the water contained therein to produce a biphasic stream having liquid and gaseous phases;

removing the liquid phase from the biphasic stream in a phase separator; and feeding the gaseous phase from the phase separator to a dehydration apparatus so as to remove at least some of the water contained therein and produce a stream of the dried gaseous phase.

2. The method of claim 1, wherein the feed gas is extracted from a subsea or subterranean oil or gas field has not been dehydrated after extraction therefrom.

3. The method of claim 1, wherein the dry conditioned natural gas meets pipeline specifications for natural gas or fuel specifications for natural gas-powered heavy equipment.

4. The method of claim 1, wherein the dry conditioned natural gas has a carbon dioxide concentration below 3% (vol/vol) and a $C_{3+}$ hydrocarbon dewpoint of no more than −20° C.

5. The method of claim 1, wherein the dried gaseous phase has a water content of no more than 2 ppm.

6. The method of claim 1, wherein each of the first and second separation units comprises an adsorbent bed, at least one of the adsorbent beds exhibits adsorptive affinity for $C_{3+}$ hydrocarbons over methane, at least one of the adsorbent beds exhibits adsorptive affinity for water over methane, and at least one of the adsorbent beds exhibits adsorptive affinity for $CO_2$ over methane.

7. The method of claim 1, wherein the first and second separation units comprise first and second gas separation membrane units, respectively, the first gas separation membrane unit comprises one or more membranes in parallel or in series each of which has a selective layer that is selective for $C_{3+}$ hydrocarbons over methane and water over methane, and the second gas separation unit comprises one or more membranes in parallel or in series each of which has a selective layer that is selective for $CO_2$ over methane.

8. The method of claim 7, wherein the selective layer of each of the gas separation membranes of the first gas separation membrane unit comprises a polymer or copolymer including repeating units of a monomer selected from the group consisting of tetramethylene oxide, propylene oxide, and ethylene oxide.

9. The method of claim 8, wherein the polymer or copolymer comprises repeating units according to formula (I):

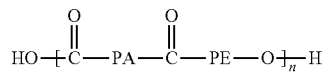

wherein:
PA is an aliphatic polyamide according to formula (II) or formula (III):

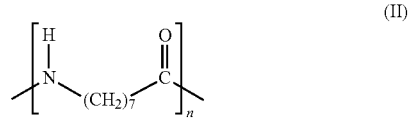

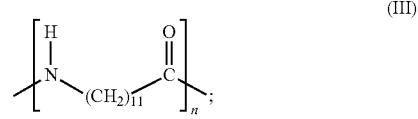

and
PE is selected from the group consisting of poly(ethylene oxide) and poly(tetramethylene oxide).

10. The method of claim 8, wherein the polymer or copolymer comprises copolymers obtained by copolymerization of acrylated monomers containing oligomeric propylene oxide, ethylene oxide, or tetramethyelene oxide.

11. The method of claim 8, wherein the polymer or copolymer comprises a copolymer copolymerized from the monomers according to formulae (IV) and (V):

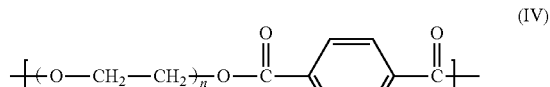

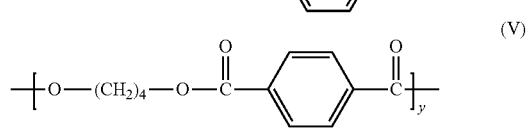

where x+y=1.

12. The method of claim 8, wherein each of the gas separation membranes of the first gas separation membrane unit has a membrane productivity for methane of below 20 GPU.

13. The method of claim 7, wherein a pressure drop between the feed gas and the water-deficient and $C_{3+}$ hydrocarbons-deficient stream of the first gas separation membrane unit is less than 50 psi (3.45 bar).

14. The method of claim 7, wherein the selective layer is supported by a support layer comprising poly(ether ether ketone).

15. The method of claim 1, wherein the dehydration apparatus comprises a molecular sieve.

16. The method of claim 1, wherein the dehydration apparatus comprises a gas separation unit comprising one or more gas separation membranes that are selective for water over $CO_2$ and selective for water over $C_{3+}$ hydrocarbons.

17. The method of claim 7, wherein the selective layer of each of the gas separation membranes of the second gas separation membrane unit comprises a polymer or copolymer selected from the group consisting of polyimides, cellulose acetate and polysulfone.

\* \* \* \* \*